Feb. 13, 1962 C. C. HALBERSTADT 3,021,417
PORTABLE WELDING TOOL OR GUN
Filed June 16, 1959 2 Sheets-Sheet 1
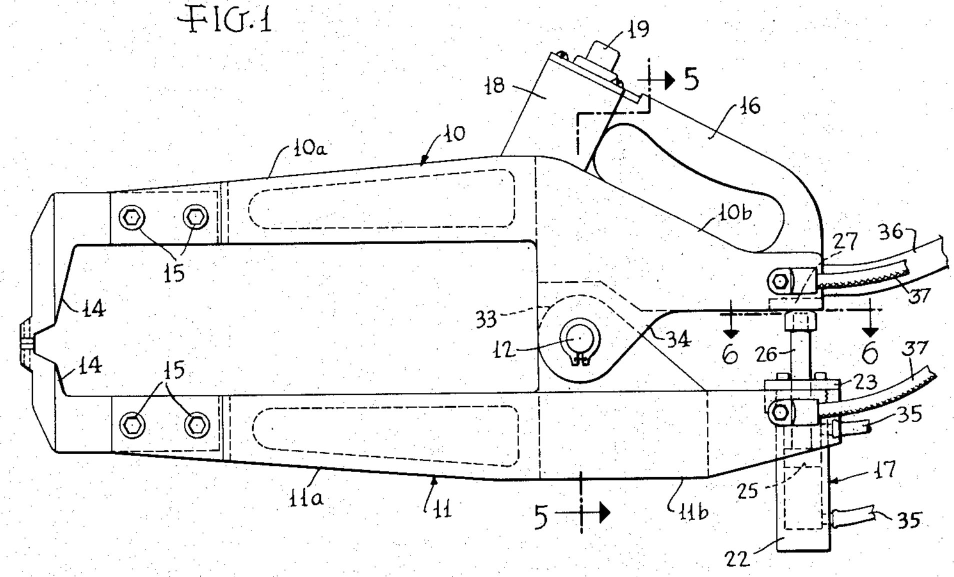
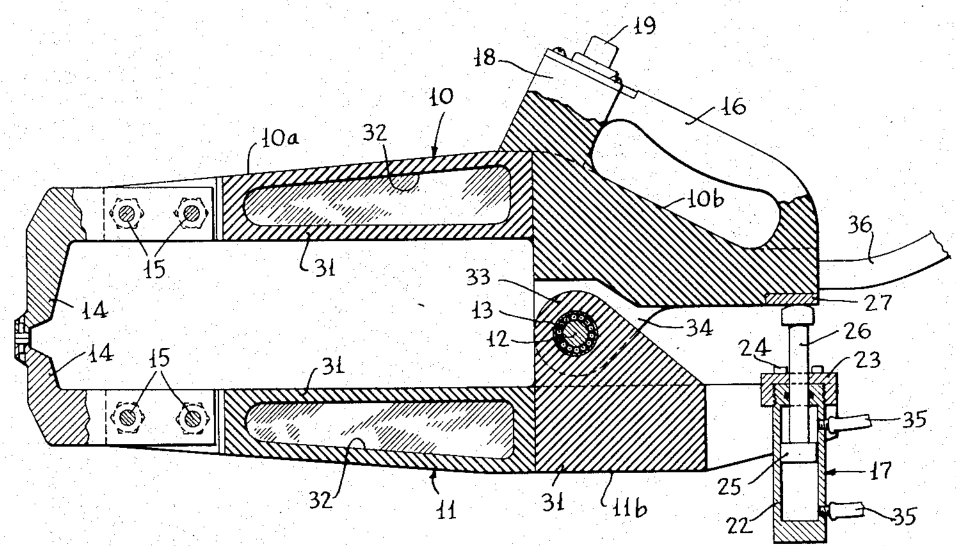
INVENTOR
Charles C. Halberstadt
BY
Wm. R. Glisson
ATTORNEY Feb. 13, 1962 C. C. HALBERSTADT 3,021,417

PORTABLE WELDING TOOL OR GUN

Filed June 16, 1959 2 Sheets-Sheet 2

INVENTOR
Charles C. Halberstadt

BY
Wm. R. Glisson
ATTORNEY

United States Patent Office 3,021,417 Patented Feb. 13, 1962

3,021,417

PORTABLE WELDING TOOL OR GUN

Charles C. Halberstadt, Philadelphia, Pa., assignor to The Budd Company, Philadelphia, Pa., a corporation of Pennsylvania Filed June 16, 1959, Ser. No. 820,653
8 Claims. (Cl. 219—89)

This invention relates to a portable welding tool or gun and has for an object the provision of improvements in this art.

One of the particular objects of the invention is to provide a welding tool which is very small and light yet very rigid and strong for its size.

Another object is to provide a welding tool having hinged tong or scissor arms or levers which are formed of metal shells and reinforcing non-metallic fillers.

Another object is to provide reinforced metallic-and-non-metallic arms or levers which are hinged together through the metal shell on one side and the non-metallic filler on the other side.

Another object is to provide reinforced metallic-and-non-metallic arms or levers which are operated by a motor mounted on the metal shell of one lever and acting against a metal plate secured to the reinforcing insulation of the other lever.

The above and other objects and advantages of the invention will be apparent from the following description of an exemplary embodiment, reference being made to the accompanying drawings wherein:

FIG. 1 is a side elevation of the welding tool in closed position;

FIG. 2 is an intermediate vertical section;

Figure 3:
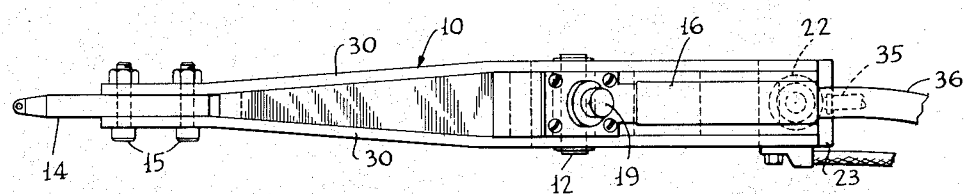
FIG. 3 is a top plan view.
Figure 4:
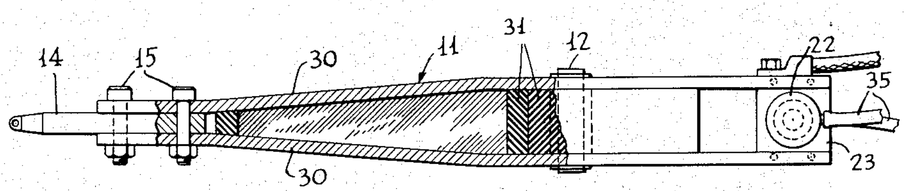
FIG. 4 is a bottom plan view partly in section.
Figure 6:
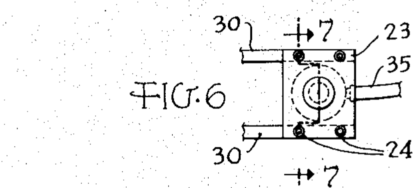
FIG. 6 is an intermediate plan view taken on the line 6—6 of FIG. 1.
Figure 7:
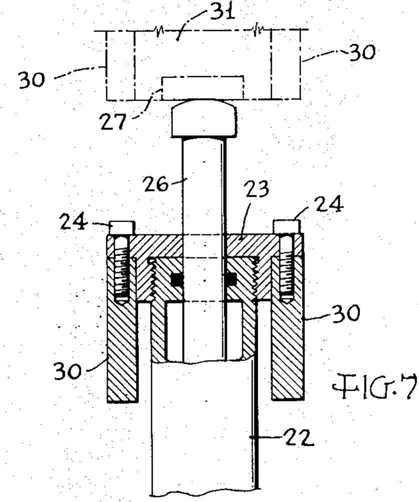
FIG. 7 is a transverse vertical section taken on the line 7—7 of FIG. 6.

The device comprises an upper lever 10 and a lower lever 11 hinged together by a pivot pin 12. Needle roller bearings 13 are provided at the hinge connection on the pin 12.

The levers 10 and 11 comprise the forward ends **10*a* and 11*a*, to which metal welding electrode tip fittings 14 are attached by bolts 15, and rearward arms 10*b* and 11*b* respectively which are provided with a handle 16 and a lever operating motor 17**.

A control switch 18, having a push button 19, is housed in the front portion of the handle convenient for actuation by the thumb of the operator.

The motor 17, as here shown, includes a fluid cylinder 22 threaded into a cap 23 secured to the lever by bolts 24 and a piston 25 operative in the cylinder with the end of its piston rod 26 rounded and acting against a metal plate 27 secured to the other lever in any suitable way, as by adhesive.

The levers 10 and 11 comprise metal shells 30 and non-metallic fillers 31, as of a strong light plastic material, which are bonded to the metal shells, as by adhesive, preferably by what is known as the "cycle-weld" process. The filler itself may have cavities, as at 32, for lightness.

Figure 5:
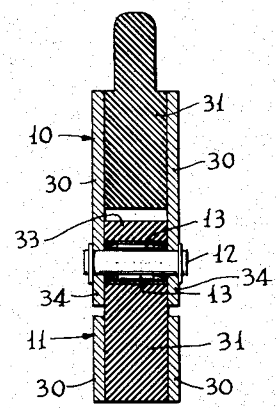
FIG. 5 is a vertical section taken on the line 5—5 of FIG. 1.

The handle 16 is formed of non-metallic material, the metallic shell 30 extending rearwardly below the handle as shown in FIGS. 1 and 5. The pivot pin 12 and its needle roller bearings are carried by a projection 33 of non-metallic material which extends above the metallic shell sides of the lower lever, as shown in FIG. 5, and the ends of the pin are secured in projections 34 which extend down below the non-metallic filler of the upper lever. No other insulation is necessary to insulate the two levers from each other at the pivot joint between them. The cylinder 22 is secured to shell sides of the lower lever but since the reaction plate 27 is bonded to non-metallic material of the upper lever no other insulation is needed.

Fluid tubes 35 serve the cylinder 22 of the arm-operating motor. A power cable 36 leads to the usual transformer and fluid controls so that when the button 19 is pushed down the electrode tips are first closed or clamped on the workpiece by the motor 17 and thereafter the welding current is applied for the required time after which the current is cut off and the electrode tips released. Power cables 37 connect the shells, and through them the welding tips, to a power supply, such as the transformer mentioned above.

The levers and their components are so designed and arranged that the lower lever tip may hang down away from the upper lever tip so that the tips may be brought manually into contact with the workpiece and the action of the motor either brings the lower electrode up against the lower side of the workpiece or applies pressure if the electrodes have been closed by hand. The latter procedure is very advantageous when working on light fragile workpieces.

The operation of the welding tool will be understood from the above description. It is seen that the invention provides a simple, light, sturdy, durable and dependable tool for making resistance welds, especially in light fragile material.

While one embodiment of the invention has been described for purposes of illustration it is to be understood that there may be various embodiments and modifications within the scope of the invention.

What is claimed is:

1. A scissors-type portable welding tool comprising in combination, a first electrode lever having an outer metal shell and an interior rigidifying non-metallic filler, a second electrode lever pivotally connected intermediate its length to the first said electrode lever and having an outer metal shell and an interior rigidifying non-metallic filler, the non-metallic fillers extending from near the operating electrode end of the levers back past the hinge point between the levers to form insulated handle means, an inwardly extending non-metallic projection intermediate the length of one of said levers, said projection being an extension of said filler, inwardly extending metallic projections intermediate the length of the other lever and overlying the sides of the non-metallic projection at its end, and a hinge pin passing through said projections to hinge the levers together.

2. A portable welding tool as set forth in claim 1, further including in combination in said handle means formed by the extension of said interior rigidifying non-metallic filler, a control switch integral therewith.

3. A portable welding tool as set forth in claim 2, further characterized by the fact that the control switch energizes power cables connected to the outer metal shells of said electrode levers.

4. A portable welding tool as set forth in claim 2, further including in combination a motor operator connected to one said electrode lever and cooperating with the other said electrode lever at the handle means end, said motor being controlled by said control switch.

5. A portable welding tool comprising in combination, two electrode levers pivoted intermediate the electrode tip end and the handle end, each said lever comprising substantially flat thin metal sheet means separated by a relatively thick insulation means which substantially fills the space between the metal sheet means and conforms to the shape of said levers, a handle formed by the extension of said insulation of one of said levers having a hand hold and a control switch integral therewith, removable electrode tips electrically connected to opposite disposed ends of said metal sheet levers, power cable means electrically connected to said metal sheet levers at the handle ends, a motor operator connected to one lever and cooperating with the other lever, and control means operated by said control switch for energizing said power cables and simultaneously applying pressure to the motor operator.

6. A portable welding tool as set forth in claim 5, wherein said pivot for said pivoted levers is provided by an outward extension of said insulation of one of said levers cooperating with a recess in said insulation of the other lever.

7. In a portable welding tool, comprising in combination a first and a second electrode lever, each said lever comprising thin, flat metal sheet means separated by a relatively thick insulation means which substantially fills the space between the metal sheet means and conforms to the shape of said levers, one of said levers having a bifurcated protrusion of said metal on said insulation and the other of said levers having a protrusion of said insulation forming a pivot connection with said bifurcated protrusion, and pin connector means inserted through an aperture of said protrusions to form a pair of pivoted electrode levers.

8. A portable welding tool comprising in combination, a first and a second electrode lever pivoted at an intermediate point, each said lever comprising substantially flat thin metal sheet means separated by a relatively thick insulation means which substantially fills the space between the metal sheet means and conforms to the shape of said lever, a handle formed by the extension of said insulation having a hand hold and control switch integral therewith, electrode tips electrically connected to the metal sheet means of said levers, and power cable means electrically connectable to said sheet means of said levers by said control switch, pivot means formed by an outward extension of said insulation of one of said levers cooperating with a pinned, connected recess in said insulation of the other lever, and a motor operator attached to one lever and cooperating with the other lever at the handle end of said lever, said motor and said power cable being energized by said control switch for applying pressure and electric current simultaneously to said electrode tips.

References Cited in the file of this patent

UNITED STATES PATENTS

| | | |
|---|---|---|
| 1,869,448 | Woodring | Aug. 2, 1932 |
| 2,189,784 | Eckman | Feb. 3, 1940 |
| 2,235,956 | Beiderman | Mar. 25, 1941 |
| 2,341,458 | Martin | Feb. 8, 1944 |
| 2,467,629 | O'Neill | Apr. 19, 1949 |
| 2,768,276 | Arntzen | Oct. 23, 1956 |